United States Patent [19]

Sugden

[11] 4,046,029
[45] Sept. 6, 1977

[54] HYDROMECHANICAL TRANSMISSION

[75] Inventor: Kenneth B. Sugden, Rockford, Ill.

[73] Assignee: Sundstrand Corporation, Rockford, Ill.

[21] Appl. No.: 722,233

[22] Filed: Sept. 10, 1976

[51] Int. Cl.² ............................................. F16H 47/04
[52] U.S. Cl. ........................................ 74/687; 60/487
[58] Field of Search ................... 74/674, 687; 60/437, 60/487

[56] References Cited

U.S. PATENT DOCUMENTS

| 2,817,250 | 12/1957 | Förster | 74/687 |
| 3,404,584 | 10/1968 | Trautmann | 60/487 X |
| 3,969,957 | 7/1976 | DeLalio | 74/687 |

Primary Examiner—Edgar W. Geoghegan
Attorney, Agent, or Firm—Ted E. Killingsworth; William R. Peoples; Michael B. McMurry

[57] ABSTRACT

A hydromechanical transmission including an input shaft, an axial piston hydraulic pump assembly associated with the shaft to be driven thereby, a pivotal swash plate operatively associated with the pump for selectively varying the displacement thereof, an axial piston hydraulic motor assembly coaxial with the pump, and a floating valve plate disposed between and engaging the pump and motor. A sun gear is carried by the motor, while a ring gear is carried by the pump. A rotatable output carrier is coaxial with the shaft and carries at least one planet gear engaged with both the sun and ring gears. The output of the transmission is taken from the carrier.

8 Claims, 5 Drawing Figures

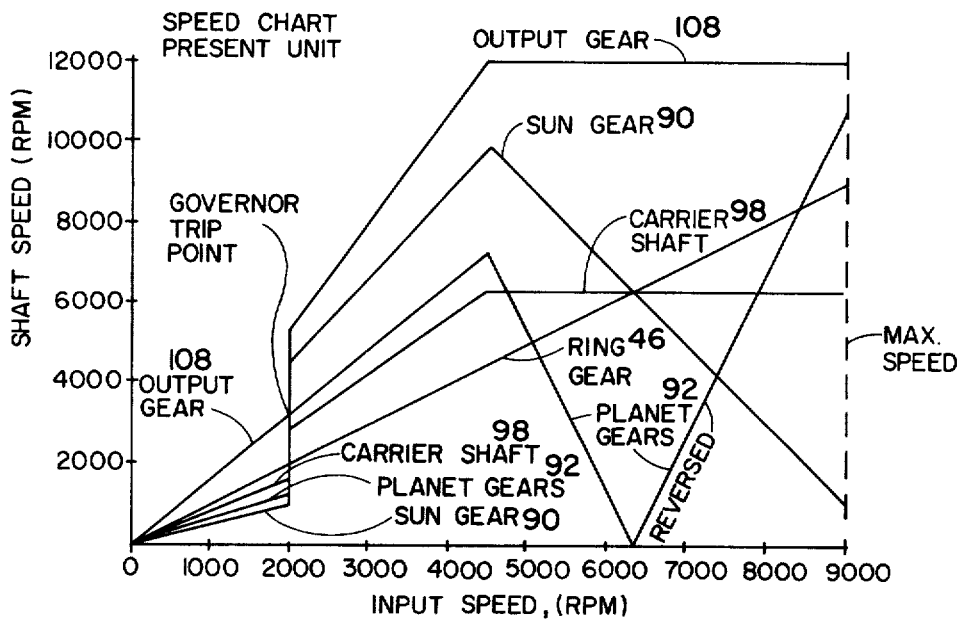
FIG. 4
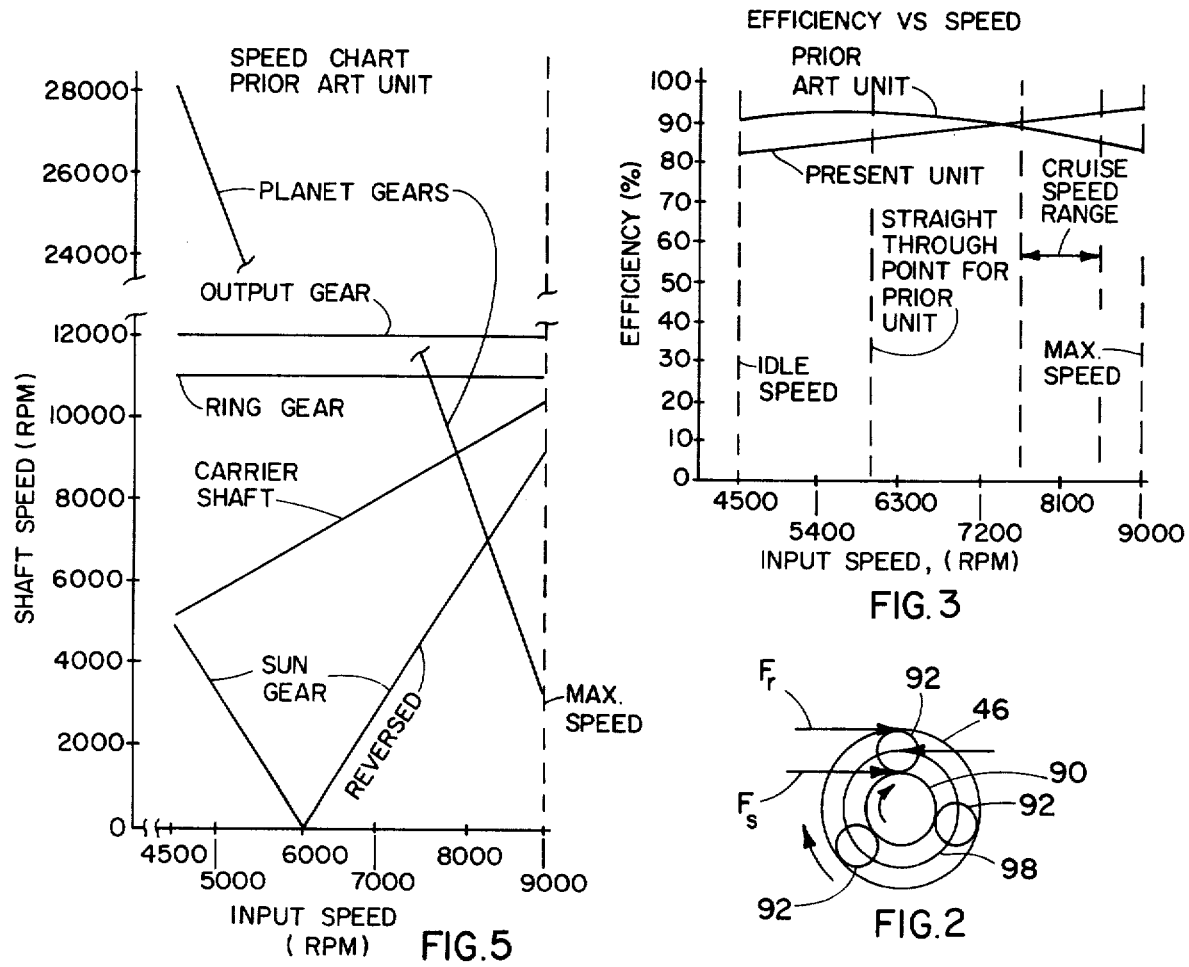
FIG. 5
FIG. 3
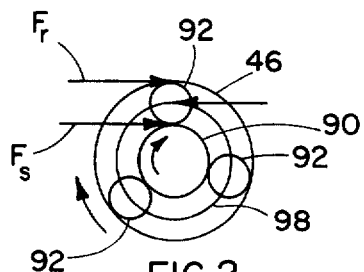
FIG. 2

HYDROMECHANICAL TRANSMISSION

BACKGROUND OF THE INVENTION

The present invention relates generally to hydromechanical transmissions and, more specifically, to hydromechanical transmissions of the type utilized to provide a constant speed output from a variable speed input. Typically, transmissions of this type are utilized in aircraft with the aircraft engine driving the transmission at a variable input speed. The input power is transmitted both hydraulically and mechanically through the transmission with the outputs of the hydraulic and mechanical sections of the transmission being summed to drive an output shaft at a constant speed. A generator is connected to the output shaft and thus also is driven at a constant speed so as to produce a constant frequency source of electrical power for the various accessories of the aircraft.

Transmissions of the foregoing general character are disclosed in U.S. Pat. Nos. 3,365,981 and 3,733,924. Another, possibly relevant transmission, although not of the constant speed output type, is disclosed in U.S. Pat. No. 3,489,036.

SUMMARY OF THE INVENTION

THe primary object of the present invention is to provide a new and improved hydromechanical transmission which is more compact, lighter in weight, sturdier, mechanically simpler, and more efficient in normal service use than prior hydromechanical transmissions of a similar general character. A more detailed object is to achieve the foregoing by constructing the transmission so that the power transmitted mechanically through the transmission is added to the power transmitted hydraulically within the normal operative range of the transmission, with the mechanically transmitted power providing the far greater percentage of the total transmitted power at normal cruise speeds of the aircraft within which the transmission is used.

The invention also resides in the novel manner of integrating the mechanical and hydraulic sections of the transmission so as to simplify the structure of the transmission and in the provision of a unique, floating valve plate through which fluid passes between rotating parts in the hydraulic section of the transmission. Further, the invention resides in the novel construction and manner of mounting the floating valve plate so as to avoid wear between the rotating hydraulic parts of the transmission in service use.

These and other objects and advantages of the present invention will become more apparent from the following detained description when taken in conjunction with the accompanying drawings.

BRIEF DESCRIPTION OF THE DRAWINGS

FIG. 2 is a diagrammatic illustration of parts of an epicyclic train of gears employed in the exemplary transmission.

FIG. 3 is a combined graph illustrating efficiency versus input speed curves for the exemplary hydromechanical transmission and a prior art hydromechanical transmission.

FIG. 4 is an illustration of the speed chart for the exemplary hydromechanical transmission.

FIG. 5 is an illustration of a speed chart for a prior art hydromechanical transmission.

DETAILED DESCRIPTION OF THE PREFERRED EMBODIMENT

Figure 1:
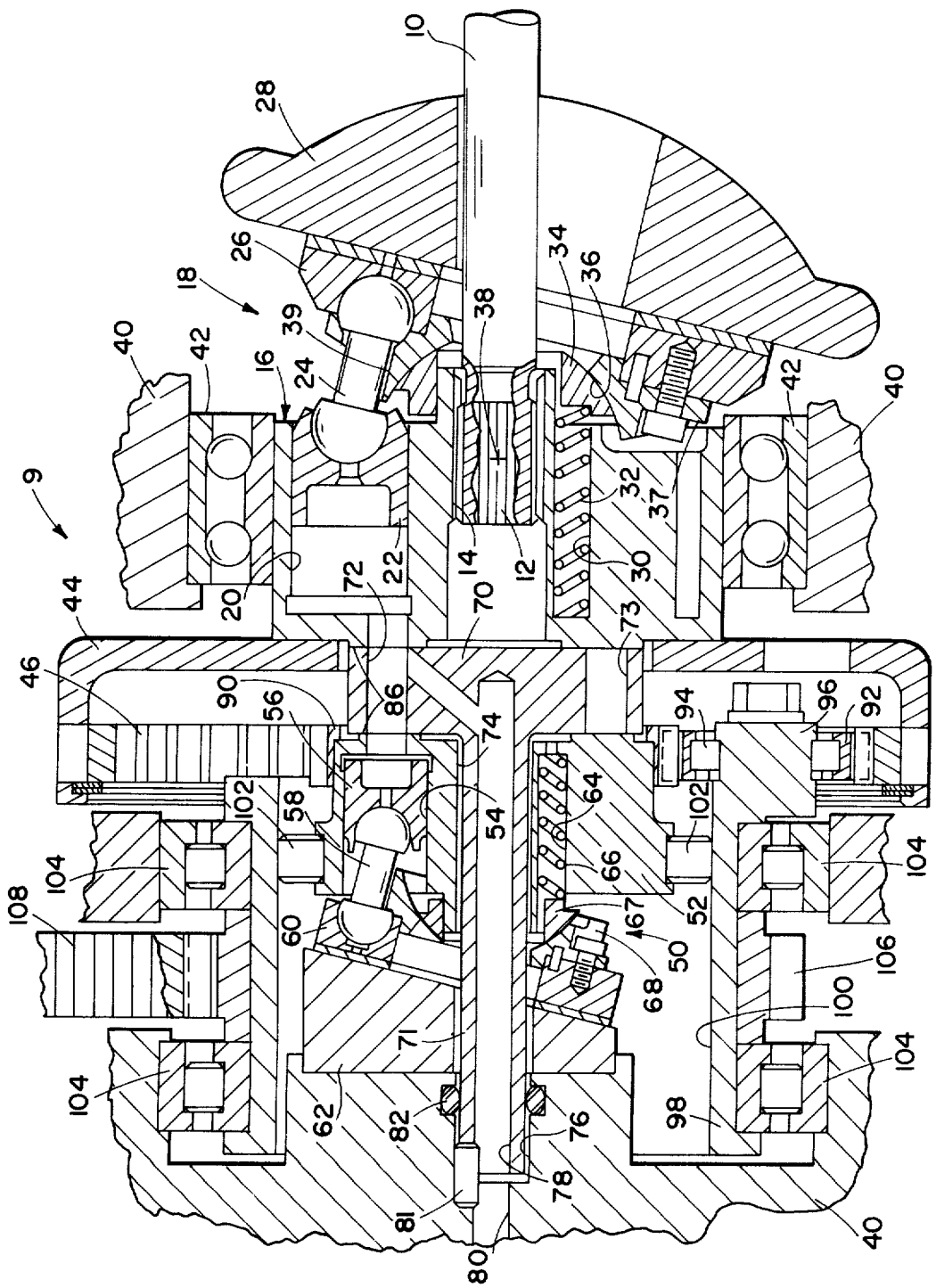
FIG. 1 is a fragmentary, cross-sectional view of a hydromechanical transmission embodying the novel features of the present invention.

As shown in the drawings for purposes of illustration, the present invention is emobodied in a hydromechanical transmission 9 particularly suited for use in providing a constant speed drive for a low power generator such as one having a power rating generally in the range of 20 to 60 kilowatts. Herein, the transmission includes an input shaft 10 adapted to be connected at one end to a prime mover (not shown) such as the engine of an aircraft. The other end 12 of the shaft is splined and received in a complimentary splined bore 14 in a cylinder block 16 of an axial piston, hydraulic pump assembly, generally designated 18. The pump supplies a driving fluid to a smaller displacement motor 50 which, in turn, through a suitable epicyclic gear train drives a gear 108 to transmit rotational power to a generator at a constant speed. Preferably, the pump 18 and the motor 50 are constructed in the so-called "half-head" manner such as that disclosed in U.S. Pat. No. 3,396,670.

More particularly, as shown in FIG. 1, the pump block 16 is provided with a plurality of chambers or bores 20, extending parallel to shaft 10 and in a concentric annular array around the shaft. Each of the bores receives a piston 22 for reciprocation therein and a rod 24 interconnects each piston 22 and an annular plate 26 which is in slidable engagement with a conventional, pivotally mounted swashplate 28. In addition, the block includes a plurality of circumferentially spaced bores 30, each receiving a spring 32 which bears against a hemispherical member 34 which, in turn, is received in a hemispherical recess 36 in a retainer 37 secured to the plate 26. The springs 32 bias the block 16 and the hemispherical member 34 away from each other. The relationship of the parts is such that the swashplate 28 may be provided about an axis extending through point 38 to vary the displacement of the pump in a conventional manner. The rods 24 are maintained generally perpendicular to the plate 26 by guidance in grooves 39 in ring 37 but have some freedom of movement in the grooves as taught in the afore-mentioned U.S. Pat. No. 3,396,670.

The exemplary transmission 9 further includes a housing, parts of which are designated 40, and the block 16 is journaled for rotation in the housing 40 by bearings 42. Mounted within the housing coaxially with the pump 18 is the motor 50 which includes a rotatable block 52 provided with an annular array of axial chambers 54 each receiving a piston 56. Each of the pistons 56 is connected by a rod 58 to an annular plate 60, which slidably engages a fixed swashplate 62 secured to the housing 40 by any suitable means. The block 52 also includes an annular array of axial bores 64 for receipt of springs 66 which bear against an axially fixed hemispherical element 67 and serve to bias the block 52 toward the right as viewed in FIG. 1. The hemispherical element 67 seats in a retainer ring 68 corresponding to ring 37 in the pump.

Between the pump 18 and the motor 50, a valve plate 70 is provided with a pair of arcuate ports 72 and 73 arranged in conventional fashion to establish fluid communication between the pump and the motor. Because of the difference between the fluid displacements of the pump 18 and the motor 50, the axial forces generated by operation of the pump are greater than those generated by operation of the motor. In order to achieve a balance of these axial forces on opposite sides of the port plate 70, the axial forces generated by the pump in excess of the axial forces generated by the motor are taken up by utilizing bearings 42 which are of the axial thrust, preloaded type. Herein, these bearings act between the periphery of the cylinder block 16 and the housing 40 and provide active support in both radial and axial directions. The bearings, however, are only one way of supporting the unbalanced load caused by operation of the larger pump and smaller motor.

Advantageously, the valve plate 70 located between the pump and motor blocks 16 and 52 is mounted so as to "float" in both radial and axial directions. In the present instance, the plate 70 includes an elongated stem 71 which extends through a bore 74 in the motor block 52 and is received within a bore 76 in the housing 40. The interior of the stem 71 is provided with a conduit 78 which is disposed in fluid communication with a conduit 80 in the housing 40 for receipt of pressurized oil from a supply (not shown) to replace fluid lost during operation of the transmission. Preferably, the stem 71 is sealed against the bore 76 by an O-ring 82 and is keyed in a desired circumferential position by a key 84. Leakage fluid within the housing is collected and returned to the supply.

Engaging the opposite faces of the floating valve plate 70 are bearing lips 86 which are integrally formed with the motor block 52 and the pump block 16 and engage the plate 70 around the opposite ends of the ports 72 and 73. It will be recognized that the only securement of the valve plate 70 is that provided by the relatively loose fit of the stem 71 within the bore 76. As a consequence, clearances between the stem 71, the motor block 52 and the housing 40 enable the port plate 70 to move or "float" in both the axial and radial directions. This movement, while slight, advantageously helps avoid metal-to-metal contact of the port plate with the cylinder blocks 16 and 52 such as might otherwise occur when an unbalance of forces in the transmission 9 tends to cock the cylinder blocks relative to their normal rotational axis during operation of the transmission. By floating, the plate is free to move with the blocks in both axial and transverse directions so that the hydrostatic films on either side of the port plate are kept from being penetrated by the rotating cylinder blocks thereby avoiding scoring or metal to metal wear between the plate and the cylinder blocks. Typically, any axial and transverse movement of the cylinder blocks caused by unbalanced forces is due to tolerance clearances between parts of the unit as well as hydrostatically generated clearances.

Providing the mechanical power transmitting section of the exemplary transmission 9 is an epicyclic train gear which, herein, includes an internal ring gear 46 carried by the peripheral flange of a bell-shaped housing 44 secured to the pump block 16. The ring gear meshes with one or more, generally at least three, planet gears 92 journaled on circumferentially spaced stub shafts 96 extending from one edge of a tubular carrier 98. The carrier includes an internal bore 100 in which the motor block 52 is journaled by means of roller bearings 102, providing support against radially directed movement of the motor block. Within the bore 100, the planet gears 92 mesh with a sun gear 90 which is mounted on the periphery of the motor block 52. Provided on the periphery of the carrier 98 is a gear 106 which serves as an output from the transmission and meshes with the gear 108 to provide a constant speed drive for the generator.

Because the rotation of the planet gears 92 reverses during operation of the present transmission, special antifriction bearings 94 support the planet gears rotatably on the carrier 98 so as to avoid losing the hydrodynamic oil film in the connection between the planet gears and the carrier when the gears reverse turning direction. Supporting the carrier 98 for rotation within the housing 40 are suitable roller bearings 104.

With the present transmission 9 employed in a constant speed drive, a speed sensor (not shown) is utilized in a conventional fashion to alter the angle of the swashplate 28 in response to speed variation to thereby adjust the displacement of the pump 18 so as to keep the output speed constant. As is well known, the speed of the motor 50 will be varied by the volume of fluid provided to it at any given period of time. As consequence, its rate of rotation will vary depending upon the volumetric flow rate to it, with the consequence that the interaction between the sun and ring gears via the planet gears will be varied to thereby maintain desired constant output speed.

In operation of the present transmission 9, the two cylinder blocks 16 and 52 always are rotated in the same direction, although at different relative speeds, so that, within the normal speed range of the input shaft 10, the torque transmitted hydraulically always is added to the torque transmitted mechanically. As illustrated diagrammatically in FIG. 2, forces $F_r$ and $F_s$ are applied by the ring and sun gears 46 and 90, respectively, to the carrier 98 so that the forces are additive and rotate the carrier in the same direction that the ring and sun gears are rotated. At an idle speed for the transmission (e.g. 4500 rpm), the rotation produced hydraulically is at a maximum because the swashplate 28 is set for maximum pump displacement. But, as the input shaft speed increases toward its maximum speed and the swashplate angle is decreased, the hydraulic percentage of output rotation also decreases, approaching toward zero at maximum input shaft speed so that the far greater percentage of output rotation is supplied through the epicyclic section of the transmission. This output is produced more efficiently simply because the epicyclic section of the transmission operates more efficiently than the hydraulic section. Accordingly, with the aircraft operating within the normal cruise speed range of the aircraft so the input shaft rotates at a speed below a maximum speed (e.g. 9000 rpm), a more efficient output is achieved. In prior systems, operating at cruise speeds, the percentage of hydraulic rotation is a higher percentage of the output and, therefore, is less efficient.

The graph illustrated in FIG. 3, shows the relationship between the output efficiencies of the present hydro-epicyclic transmission and a prior hydromechanical transmission in which the mechanical transmitting sections are mounted separately from the hydraulic transmitting sections. Typically, with such a prior system, at some point generally central of the input speed range, the pump displacement is zero so the motor block speed is zero with all of the rotational output being supplied through the mechanical section of the transmission. This point is referred to as a "straight through point" of the transmission. While it is desirable to run at this point from the standpoint of efficiency, it is extremely difficult to maintain proper control of the transmission due to system instability which is caused primarily by the difference in the static and kinetic coefficients of friction involved when moving the motor block from zero speed. For example, when operating the prior transmission at the straight through point, if demand is made for slightly increased or decreased output speed, the control adjustment made in the position of the pump swashplate tends to overcompensate in order to overcome the static friction associated with the motor block. This tends to increase or decrease the output speed beyond that which is needed, thereby causing a second control demand in the reverse direction. The exemplary hydro-epicyclic transmission avoids the foregoing problem because its straight through point is beyond the normal operating speed range of the input shaft 10.

In comparing the speed chart (FIG. 4) of the parts of the present transmission and the speed chart (FIG. 5) of the prior art transmission, it is seen that the rotational speed of the planet gears 92 falls within a fairly low range. In contrast to the speed of the output gear for the prior art system wherein the planet gear speeds may be more than double the output speeds e.g., as high as 28,000 rpm (see FIG. 5), the speed range for the present planet gears 92 is below the speed of the output gear 108 for the present transmission. The point at which the speed of the planet gears 92 drops to zero is, of course, the point at which, by reason of control of the swashplate 28, the displacement of the pump 18 equals the displacement of the motor 50 so that the two cylinder blocks 16 and 52 rotate at the same speed. The reason the planet gears 92 rotate within this lower speed range is because the ring gear 46, the sun gear 90 and the carrier 98 are rotated in the same direction with the hydraulic rotation always being added to the mechanical rotation. Advantageously, at the lower operating speeds, the planet gears last longer and may be made of lower strength less expensive materials.

In the present transmission, even though the ring gear 46 and the sun gear 90 are rotated in the same directions, the relative speeds may be different. In fact, initially the sun gear rotates much faster than the ring gear causing the planet gears 92 to rotate on their axis in the opposite direction as the direction of rotation for the sun gears. As the speeds of the sun and ring gears approach each other from their idle speeds, the planet gears slow down eventually to reverse turning direction as the speed of the ring gear becomes greater than the speed of the sun gear (see FIG. 4). Thus, within the normal operating range of the present transmission, the planet gears 92 rotate at fairly low speeds.

From the foregoing, it will be appreciated that the present invention brings to the art a novel hydromechanical transmission 9 which, by virtue of mounting the epicyclic sections of the transmission directly on the cylinder blocks 16 and 52 and concentrically with the rotational axes of such blocks, enables the transmission to be made more compactly and with fewer interconnecting parts than prior hydromechanical transmissions. As a result, the present transmission is substantially lighter in weight thereby providing a high power density transmission, that is, one which provides high horsepower with respect to weight or size. Moreover, the transmission operates more efficiently within normal cruise speed ranges by taking advantage of the more efficient output of the epicyclic section of the transmission to provide the greater percentage of output power. Still further, the present construction eliminates midrange control problems by eliminating the straight through point within the normal operating speed ranges of the transmission. Even further still, the present transmission is of sturdier construction, providing a longer useful service life by avoiding high speed operation of various parts of the epicyclic sections of the transmission and by providing a unique mounting arrangement for the port plate 70 so that the plate "floats" so as to avoid metal-to-metal contact between the cylinder blocks 16 and 52 should an imbalance of forces within the transmission tend to cock the cylinder blocks with respect to the port plate.

I claim:

1. A hydromechanical transmission, comprising:
   an input shaft;
   an axial piston hydraulic pump assembly associated with said shaft to be driven thereby;
   a movable swashplate operatively associated with said pump for selectively varying the displacement thereof;
   an axial piston hydraulic motor assembly coaxial with said pump;
   a floating valve plate disposed between and engaging said pump and said motor;
   a sun gear carried by one of said pump and said motor;
   a ring gear carried by the other of said pump and motor;
   a rotatable output carrier coaxial with said pump; and
   at least one planet gear carried by said carrier and meshed with both said sun and ring gears.

2. A hydromechanical transmission, comprising:
   an input shaft;
   an axial piston hydraulic pump assembly secured to said shaft for rotation therewith;
   a movable swashplate operatively associated with said pump for selectively varying the displacement thereof;
   an axial piston hydraulic motor assembly coaxial with said pump and remote from said swashplate;
   a valve plate disposed between and engaging said pump and said motor;
   a sun gear carried by said motor;
   a ring gear carried by said pump remote from said swashplate;
   a rotatable output carrier coaxial with said shaft and surrounding said motor;
   at least one planet gear carried by said carrier and meshed with both said sun and ring gears.

3. The hydromechanical transmission of claim 2 wherein said output carrier includes an interior bore receiving said motor, said motor being journalled for rotation within said bore.

4. A hydromechanical transmission, comprising:
   an axial piston hydraulic pump assembly;
   a pivotal swashplate operatively associated with said pump for selectively varying the displacement thereof;
   means for relatively rotating said pump and said swashplate about a predetermined axis;
   an axial piston hydraulic motor assembly coaxial with said pump axis and journalled for rotation relative to said pump about said axis;
   a floating valve plate disposed between said pump and said motor to establish a hydraulic fluid flow path therebetween, said valve plate including a stem extending through one of said pump and said motor;
   a conduit in said stem and adapted to be connected to a source of hydraulic fluid;

a sun gear carried by one of said pump and said motor;

a ring gear carried by the other of said pump and motor;

a rotatable output carrier coaxial with said motor; and at least one planet gear carried by said carrier and meshed with both said sun and ring gears.

5. The hydromechanical transmission of claim 4 wherein said ring gear is defined by a bell-shaped housing secured to said other of said pump and said motor and opening toward said one of said pump and said motor.

6. The hydromechanical transmission of claim 5 wherein said output carrier comprises a tubular structure internally journalling said one of said motor and said pump and including exterior, peripheral drive means adapted to be engaged with an element to be driven.

7. A hydromechanical transmission, comprising:

an input shaft;

an axial piston hydraulic pump assembly associated with said shaft to be driven thereby;

a movable swashplate operatively associated with said pump for selectively varying the displacement thereof;

an axial piston hydraulic motor assembly coaxial with said pump;

interconnecting valve means disposed between said pump and said motor;

a sun gear carried by one of said pump and said motor;

a ring gear carried by the other of said pump and motor;

a rotatable output carrier coaxial with said pump;

at least one planet gear carried by said carrier and meshed with both said sun and ring gears;

said gears being coplanar and lying in a plane located between said pump and motor assemblies.

8. A hydromechanical transmission as defined in claim 7 wherein said valve means includes a floating valve plate, and each of said pump and motor assemblies includes a rotatable block with a series of chambers and a piston reciprocable in each chamber with said pistons being positioned within said chambers throughout the reciprocation thereof.

* * * * *